T. S. JACKSON.
Machines for Gumming Saws.

No. 146,392. Patented Jan. 13, 1874.

Witnesses.
E. Wolff
C. Sedgwick

Inventor.
T. S. Jackson
Per
Attorneys.

UNITED STATES PATENT OFFICE.

THOMAS S. JACKSON, OF LA GRANGE, TEXAS.

IMPROVEMENT IN MACHINES FOR GUMMING SAWS.

Specification forming part of Letters Patent No. 146,392, dated January 13, 1874; application filed November 8, 1873.

*To all whom it may concern:*

Be it known that I, THOMAS S. JACKSON, of La Grange, in the county of Fayette and State of Texas, have invented a new and useful Improvement in Machine for Gumming and Dressing Saws, of which the following is a specification:

The object of this invention is to provide convenient and efficient means for gumming and dressing saws without files, designed more especially for circular saws of saw-mills, but applicable to all circular as well as to vertical mill-saws; and it consists in an adjustable machine whereby an emery-wheel is made to operate on the saw in the most efficient manner.

Figure 1:
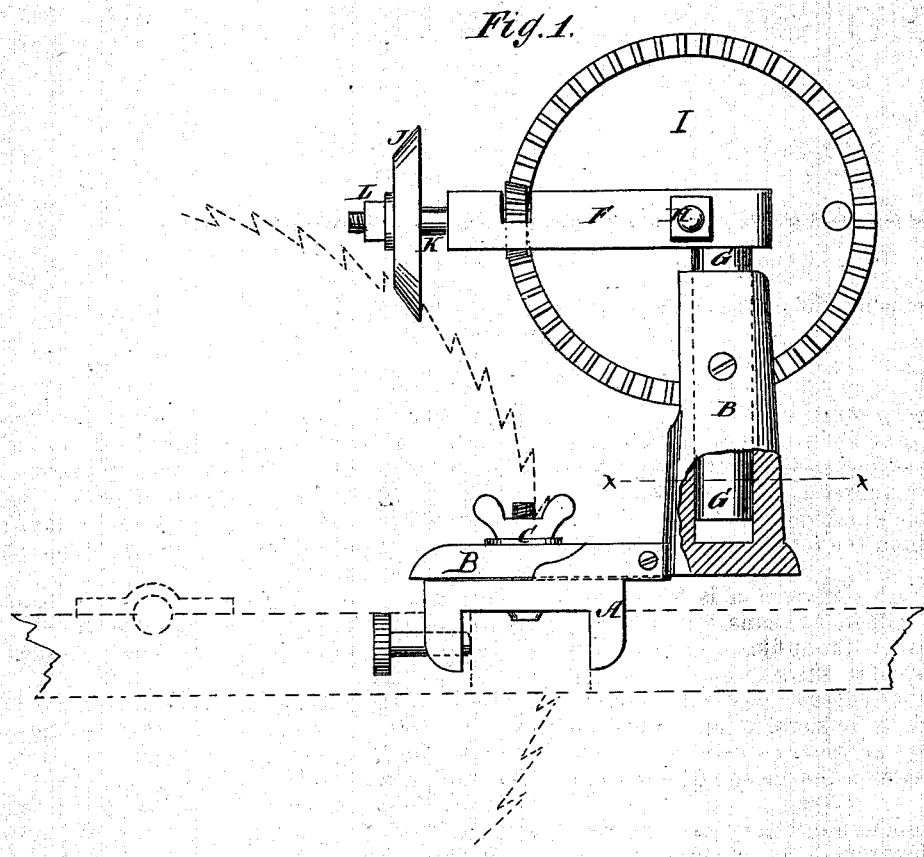
Figure 2:
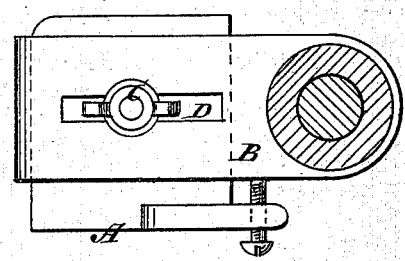

In the accompanying drawings, Figure 1 represents an elevation of the machine as when at work, the drawing being partly in section. Fig. 2 is a horizontal section of Fig. 1, taken on the line $x\ x$.

Similar letters of reference indicate corresponding parts.

A is the bed-plate, by means of which the machine is fastened to the saw-frame. B is a slotted stand or socket, which is adjustably connected with the bed-plate by a screw-bolt, C. D is the slot. This stand resembles the tool-socket of a turning-lathe, and it is made adjustable in a similar manner. F is an arm which extends horizontally at a right angle from the shank G, which latter is placed in the socket-stand, as seen in the drawing. To one side of this arm F is attached, on the horizontal arbor H, the face gear-wheel I. J is the emery-wheel, which is made fast on the arbor K by the nut L. This arbor is supported by the arm F, and has upon it a pinion, M, with which the gear-wheel I engages. A rapid revolving motion is given the emery-wheel by revolving the gear-wheel I.

The emery-wheel may be of any form to suit the shape or form of the teeth, and is adjusted to the saw to gum or dress the teeth, as seen in the drawing.

The machine may be operated by hand or by other motive power, and is made to gum or dress the teeth of a saw without the use of files, and in the most expeditious manner.

The saw may be jointed to a true circle by setting it so that the shortest tooth will just touch the emery-wheel when the latter is running, and then, slowly revolving the saw, all intervening and longer teeth will be cut and shortened, and the edge of the saw will be brought to a true circle, after which the saw is gummed and the teeth dressed as usual.

Having thus described my invention, I claim as new, and desire to secure by Letters Patent—

The adjustable standard B and adjustable arm F, in combination with the arbor K and emery-wheel J, as and for the purposes described.

THOMAS S. JACKSON.

Witnesses:
S. D. BARDIN,
JNO. W. JACKSON.